March 13, 1962 E. G. N. WESTERBERG 3,025,497

SHIFT REGISTER

Filed April 29, 1959 4 Sheets-Sheet 1

INVENTOR
ERIK GERHARD NATANAEL WESTERBERG
By: Darby & Darby
ATTORNEYS

March 13, 1962 E. G. N. WESTERBERG 3,025,497

SHIFT REGISTER

Filed April 29, 1959 4 Sheets-Sheet 2

INVENTOR

ERIK GERHARD NATANAEL WESTERBERG

By: Darby & Darby

ATTORNEYS

March 13, 1962 E. G. N. WESTERBERG 3,025,497

SHIFT REGISTER

Filed April 29, 1959 4 Sheets-Sheet 3

INVENTOR
ERIK GERHARD NATANAEL WESTERBERG

By: Darby & Darby
ATTORNEYS

March 13, 1962 E. G. N. WESTERBERG 3,025,497

SHIFT REGISTER

Filed April 29, 1959 4 Sheets-Sheet 4

INVENTOR.

ERIK GERHARD NATANAEL WESTERBERG

By: Darby & Darby

ATTORNEYS

United States Patent Office 3,025,497
Patented Mar. 13, 1962

3,025,497
SHIFT REGISTER

Erik Gerhard Natanael Westerberg, Stockholm, Sweden, assignor to Aktiebolaget Åtvidabergs Industrier, Atvidaberg, Sweden, a Swedish joint-stock company Filed Apr. 29, 1959, Ser. No. 809,765
Claims priority, application Sweden July 1, 1958
6 Claims. (Cl. 340—166)

The present invention relates to shift registers, particularly for use in computers.

Shift is an elementary arithmetic operation used in computers. For example, for multiplication it is necessary to shift the numbers representing partial products so that they are correctly displaced in relation to one another in readiness for partial additions in much the same manner as an arithmetician using pen and paper displaces successive partial products to the left.

It is known, for example, from Proceedings of the IRE, vol. 39, 1951, page 401, to make shift registers comprising magnetic cores having rectangular hysteresis loops and connecting elements between interconnected windings on said cores. The connecting elements provide unidirectional information transfer, and may be diodes or amplifiers.

In some applications it is necessary to use a plurality of parallel operating shift registers, each comprising a plurality of stages. In this case the number of connecting elements will be considerable.

It is an object of the present invention to provide a shift register circuit comprising a plurality of parallel operating shift registers, wherein the connecting elements between the cores can be eliminated.

It is another object of the invention to provide a shift register comprising the usual cores arranged in rows and columns and wherein there are two windings for each row, one of these windings linking the cores of a row and the preceding row, and the second winding linking the cores of the said row and of the suceeding row, whereby pulses supplied to the row windings sequentially become read-out half pulses in one winding and write half pulses in the succeeding winding and thus serve to condition the register for shifting recorded information.

It is a further object of the invention to provide two windings for each column of the core matrix, the first winding feeding a column amplifier and the second winding receiving the pulses from that amplifier after a delay interval thereby cooperating with conditioned cores to bring about the above mentioned shift.

Other objects and features of the invention will be apparent when the following description is considered in connection with the annexed drawing in which:

FIGURE 1 illustrates a basic shift register in accordance with my invention, engaged as a "ring";

FIGURES 2*a*–2*d* show the various pulse sequences utilized to produce the shift action;

Figure 1:
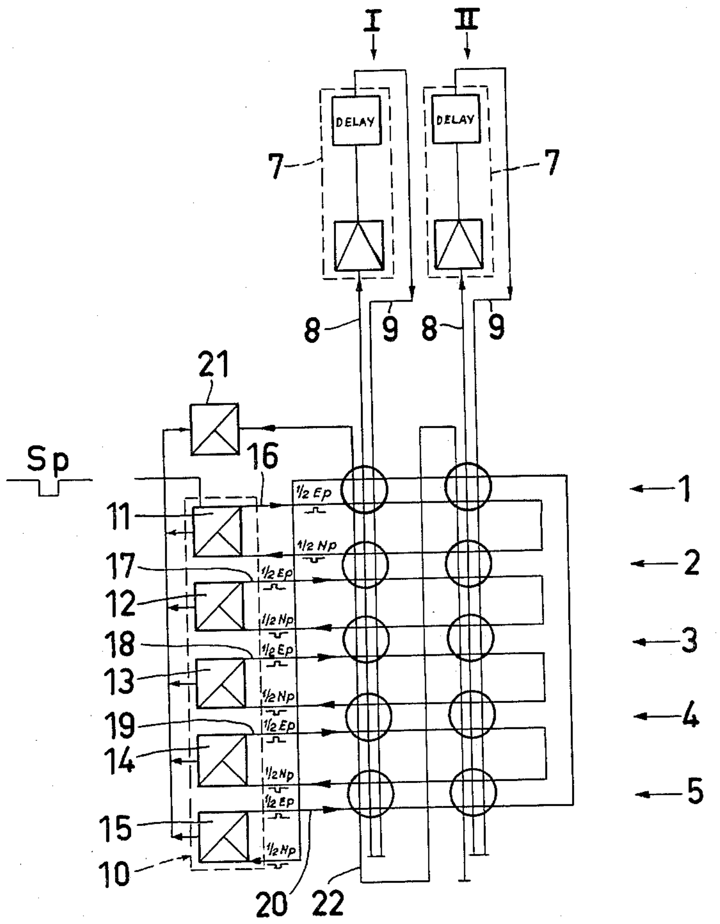

Cores of magnetic material having a rectangular hysteresis curve and therefore two states of stable remanent magnetisation are used to a great extent as memory or storage elements for storing binary information in electronic computers, data processing machines and the like. Such cores are usually designed as separate rings or as apertures in a plate of magnetic material. The cores have exciting conductors which pass through the rings and usually are wound in one or more turns upon them. The state of magnetisation of a core may be shifted from one remanence condition to the other by current impulses applied to some of these windings. One state of magnetisation of the core is arbitrarily chosen to represent the "one," the other to represent the "zero" of the binary scale. Current impulses which tend to zero-set (re-set) a one-set (set) core, i.e. to change it from the state corresponding to a binary "one" to the state corresponding to a binary "zero," are herein called "read-out pulses" or "zero-setting pulses," and current impulses which tend to one-set a zero-set core, are called "write pulses" or "one-setting pulses." A certain minimum current through the winding is required to change the magnetisation of a core from one remanence condition to the other. A current just sufficing to reverse the direction of magnetisation of the core, is herein called "full current." The half of this current, i.e. a "half current," does not substantially influence the core. This explains the terms "full write pulses" and "half write pulses" (1/1 S*p*, and ½ S*p* respectively) and "full read-out pulses" and "half read-out pulses" (1/1 L*p*, and ½ L*p* respectively). When a core is transferred from its one state of magnetisation to the other, a voltage is induced in a signal conductor or winding linked with the core. If the signal conductor passes once through an ordinary memory core, that is embraces the core with one turn, the signal voltage which arises when a full current pulse is applied to the core may be of the order of 0.025 to 0.12 volt for different core materials.

Shift is an elementary arithmetic operation in electronic computers and the like. For example, for multiplication it is necessary to shift the numbers representing partial products so that they are correctly displaced in relation to one another in readiness for partial additions, in much the same manner as an arithmetician using pen and paper displaces successive partial products one step to the left. The shift register according to the present invention comprises a number of wound ferrite cores or other bistable elements arranged in a matrix of $q$ rows having $n$ cores numbered 1, 2, 3 . . . $n$ in each row. The information in any row is represented or manifested by certain of the cores being one-set and the others zero-set. In accordance with the invention the information in the $(v+p)^{th}$ row ($p$ being preferably$=1$) is displaced or shifted to the $v$th row by reading-out the contents of the row $(v+p)$ to amplifiers corresponding in number to the columns of the matrix, said amplifiers in turn writing back the contents into row $v$. A shift of the contents of the row $(v+p)$ to the row $v$ is accomplished in the following manner:

A "half read pulse" or "half zero-setting pulse" (½ N*p*) is impressed upon all the cores in row $(v+p)$ during a time interval $(t_n-t_m)$, and a "half write pulse" or "half one-setting pulse" (½ E*p*) is impressed during the same interval $(t_n-t_m)$ upon all cores in row $v$. Furthermore, in the interval $(t_n-t_m)$ a ½ N*p* of short duration beginning at the time $t_m$, $(t_n>t_m)$, is applied to all cores in the register, so that this ½ N*p* together with the abovementioned ½ N*p* through row $(v+p)$ gives a "whole zero-setting pulse" 1/1 N*p* through row $(v+p)$. The core or cores in the row $(v+p)$ which were initially one-set, say the core in column $u$, are then zero-set and supply a signal to an amplifier $F_u$. Amplifier $F_u$ after a certain delay, viz. during the latter part of the time interval $(t_n-t_m)$, supplies a ½ E*p* to the cores in column $u$, which together with ½ E*p* sent through the row $v$ during the interval $(t_n-t_m)$ equals 1/1 E*p* to the core at the point of intersection of column $u$ and row $v$, causing this core to be one-set. The "one" has thus been transferred or shifted from column $u$, i.e. the $u$:*th* position in row $(v+p)$ to the $u{:}th$ position in row $v$. In the same manner the information from other one-set positions in the row $(v+p)$ is shifted columnwise to corresponding positions in the row $v$. A condition for shifting is that the core in question in the row, here row $v$, to which the information is shifted, is initially zero-set.

Figure 2A:
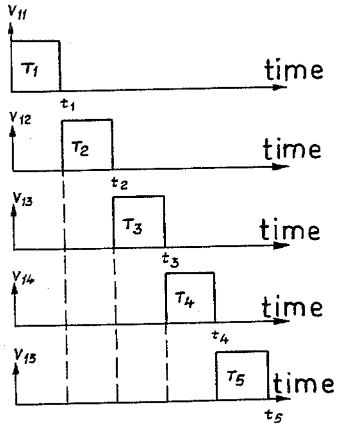
Figure 2B:
Figure 2C:
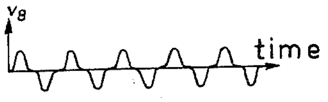
Figure 2D:

Referring now to FIG. 1 there is shown a shift register with five horizontal rows 1, 2, 3, 4, 5, each row containing only two cores. The cores of different rows are aligned vertically so that they form a matrix of five rows 1–5 and two columns I, II. With each column there is associated a delaying amplifier 7, the output signal ($v_9$, FIG. 2*d*) of which does not occur until a short time after the input signal ($v_8$, FIG. 2*c*) has been applied. All cores in a column are linked with a signal line 8 connected to the input of the respective amplifier 7, and with an output line 9 which receives the half one-setting pulses, ½ E*p*, forming the output of the respective amplifier 7. With each row is associated a pulse generator, 11–15, which generators together constitute a pulse sequence, or scanning, generator (sometimes called a sweep generator) 10. The pulses supplied by the generators 11–15 are designated in FIG. 2*a* $T_1$, $T_2$, $T_3$, $T_4$ and $T_5$ respectively. These pulses are half pulses. If the generator 11 is started by a start pulse S*p* supplied from an external source (not shown), the pulses $T_1$–$T_5$ are generated in close sequence in one scanning operation one after the other without overlap (see FIG. 2*a*). The drive lines 16–20 of the several pulse generators 11–15, carrying the half pulses, are linked with each of a pair of the core rows 1–5, drive line 16 of pulse generator 11 forming a loop linked with the cores in rows 1 and 2, drive line 17 of pulse generator 12 forming a loop linked with the cores in rows 2 and 3, and so on. The lines being looped, during the interval $(t_1–0)$ occupied by pulse $T_1$, row 2 will be traversed by ½ N*p* and row 1 by ½ E*p*. In the same manner row 3 is traversed by ½ N*p* and row 2 by ½ E*p* during the interval $(t_2–t_1)$ occupied by the pulse $T_2$ and so on. At the beginning of each T-pulse (at the instants 0, $t_1$ . . . $t_4$) an auxiliary generator 21 supplies ½ N*p* through all cores via a line 22 (FIG. 2*b*). This ½ N*p* cooperates with the ½ N*p* ($T_1$) supplied by the generator 11 to the row 2 during the time $(t_1–0)$ so that any one-set cores in this row are zero-set. The signal ($v_8$, FIG. 2*c*) induced by the change of core flux is passed to the respective amplifier 7 via the signal line 8. The signals $v_8$ are amplified and so much delayed by the amplifiers 7 that the ½ N*p* (FIG. 2*b*) from the auxiliary generator 21 has time to decay before the amplified signal ($v_9$ in FIG. 2*d*) is supplied to the respective column I or II as ½ E*p* via the output lines from the amplifiers 7. This ½ E*p* cooperates with the ½ E*p* ($T_1$) supplied by the generator 11 to the row 1 during the latter part of the interval $(t_1–0)$ so that a "one" (possibly more than one) will be written into this row (cf. FIGS. 2*a* and 2*d*). The information has thus been shifted or transferred from row 2 to row 1. During the pulse $T_2$ (interval $t_2–t_1$) a corresponding shift takes place from row 3 to row 2 and so on. The particular register illustrated in FIG. 1 has been so arranged that during the pulse $T_5$ information is shifted from row 1 to row 5; for the drive line of generator 15 has been looped through rows 1 and 5 so that a ½ N*p* is applied to row 1 and ½ E*p* to row 5 during the interval $(t_5–t_4)$ occupied by the pulse $T_5$. This shift from row 1 to row 5 causes zero-setting of row 1, and is necessary in order that the information in row 2 shall not be superimposed upon "old" information in row 1 and thus be destroyed during a following shift. This shift may be considered as an exchange process by which, during pulse $T_1$, the information in row 2 changes places with the "gap" or vacant space occurring in row 1, and by which, during pulse $T_2$, the information in row 3 changes places with the gap in row 2 and so on.

Assuming that a "one" or more "ones" are stored in row 5, while the other rows contain only "zeros," this "one" (or these "ones") is thus shifted from row 5 to row 4 during pulse $T_4$ of the first scanning cycle or pulse sequence of the generator 10. During the next scanning cycle the "one" (or "ones") is transferred or shifted from row 4 to row 3 during pulse $T_3$, and during the third scanning cycle the "one" (or "ones") is shifted from row 3 to row 2 during pulse $T_2$. The "ones" in row 2 are read out therefrom and are written in row 1 during the pulse $T_1$ in the fourth scanning cycle of the pulse sequence of scanning generator 10; but during the pulse $T_5$ in this scanning cycle the "ones" are also read out from row 1 and are written in row 5. After four scanning cycles the initial state has thus been reached again.

The register can be zero-set by sending 1/1 N*p* through the line 22 extending from the N*p*-generator 21 or through another line linked with all of the cores.

Figure 3:
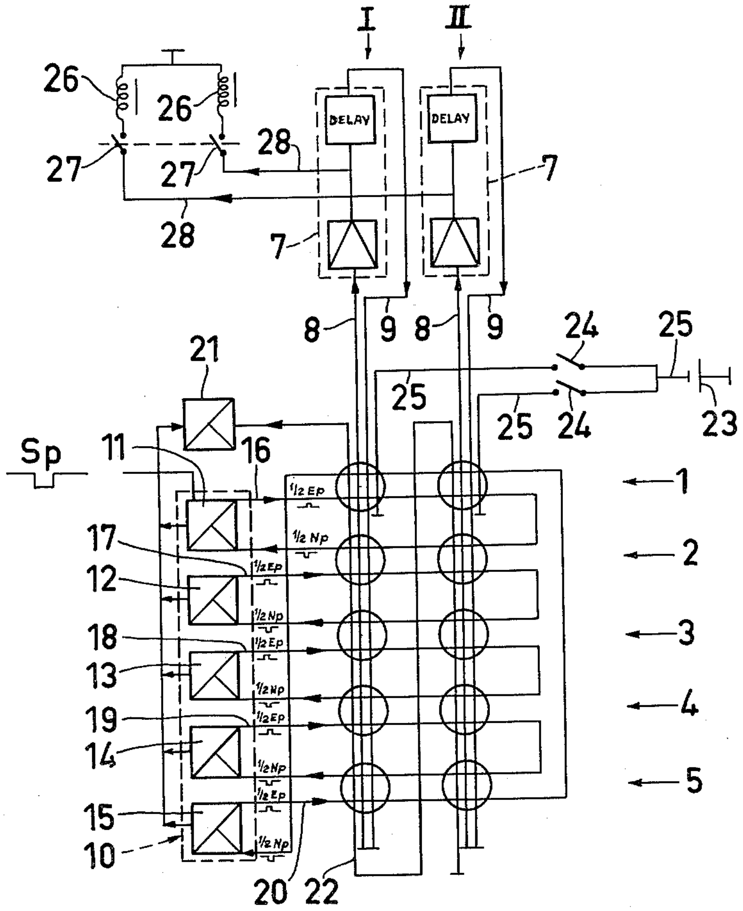
FIGURE 3 shows the basic register of FIGURE 1, together with devices for feeding information to the register and for securing outputs from the register.

The shift register of FIG. 1 may be supplemented with devices for putting information into the register and taking information out. Such a completed register is shown in FIG. 3 in which the same reference characters as in FIG. 1 are used to identify the same or analogous elements. In FIG. 3 there are illustrated, in addition to the components shown in FIG. 1, an input device comprising a direct-current source 23, a plurality of selectively operable switches 24, corresponding in number to the cores per row, and lines 25 which connect the current source 23 through switches 24 to individual cores in one and the same row (row 1 in FIG. 3). In FIG. 3 there is also shown an output device comprising a plurality of output magnets 26 corresponding in number to the columns of the matrix, said magnets being joined through interconnected switches 27 and lines 28 to the respective amplifiers 7.

An input of "ones" into row 1 is made according to FIG. 3, by closing one and/or the other of the switches 24 and thus sending one-setting currents through the cores in question in row 1 from the current source 23 on the lines 25. After each input operation the scanning generator 10 is started and generates a series of pulses $T_1$–$T_5$. During the first scanning cycle after the first input operation the information fed in is shifted from row 1 to row 5 during pulse $T_5$ of the cycle. After a further input operation and a further scanning cycle there is information in rows 4 and 5, and after a total of four such procedures the information first fed in has reached row 2 and the information last fed in is in row 5. The register is now filled and cannot receive any further information.

The contents of the various rows or positions 1–5 can be manifested or fed out by causing the amplifiers 7, during the several times $T_1$–$T_5$ in one scanning cycle, to control the output magnets 26 which in turn actuate type bars (not shown) of a typewriter or other recording or indicating means, so that the contents of the various rows are recorded or written out as numerical, alphabetical or coded characters or symbols.

Figure 4:
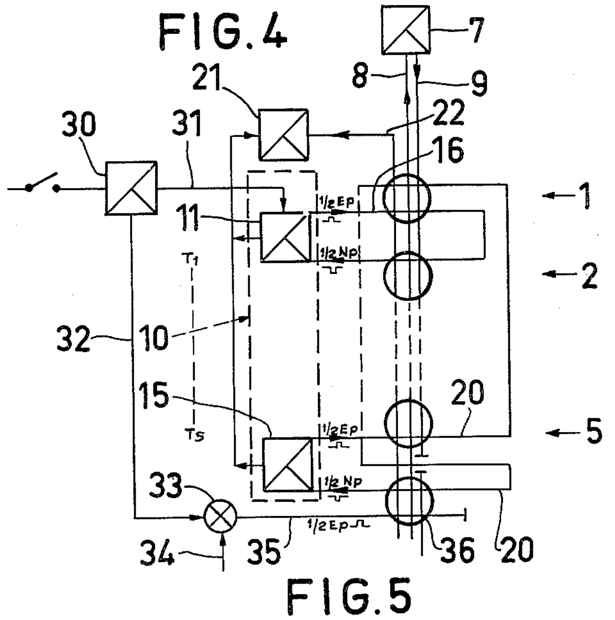
FIGURE 4 shows a modification of the shift register according to FIGURE 3 utilizing the same basic shift register but with different input and output devices.

There are other ways of putting information into a shift register; FIG. 4 shows diagrammatically a second example. In FIG. 4 where the same reference characters as in the previous figures are still used for the same or analogous components, and where only a single column of cores is shown, a start pulse generator 30 has been added which is connected through a line 31 to the pulse generator 11. The start pulse generator 30 is furthermore connected, by a line 32, to an input gate 33 to which also an input line 34 is connected. The gate 33 constitutes a coincidence circuit which lets through a pulse to an output line 35 linked with an auxiliary core 36 for feeding information into the register, only when a pulse from the input line coincides with a start pulse from line 32. FIG. 4 differs from FIGS. 1 and 3 also in that the line 20 from pulse generator 15 is linked with the core in row 5, which is the least significant order or position of the register, and with the core in row 1 as well as with auxiliary core 36. Input is accomplished while pulse $T_5$ is applied to the core in row 5. The gate 33 is open during input, and the pulse which accordingly appears on the line 35 and which is a full write or one-setting pulse, one-sets the auxiliary core 36. During the pulse $T_5$ the "one" is shifted from the auxiliary core 36 to the core in row 5 by coincidence between the zero-setting pulses (½ N$p$) on the line 22 and on the line 20 also linked with the auxiliary core 36, and between the one-setting pulses (½ N$p$) on the line 9 and on the line 20 passing through the core in row 5. It should be observed, however, that the input pre-supposes that the core in row 1 is zero-set (re-set) since a "one" in this core is normally shifted to the core in row 5 during the pulse $T_5$; otherwise one of the two "ones" in the core of row 1 and the auxiliary core 36 would become lost. The auxiliary core 36 will obviously remain zero-set after each input shift.

Figure 5:
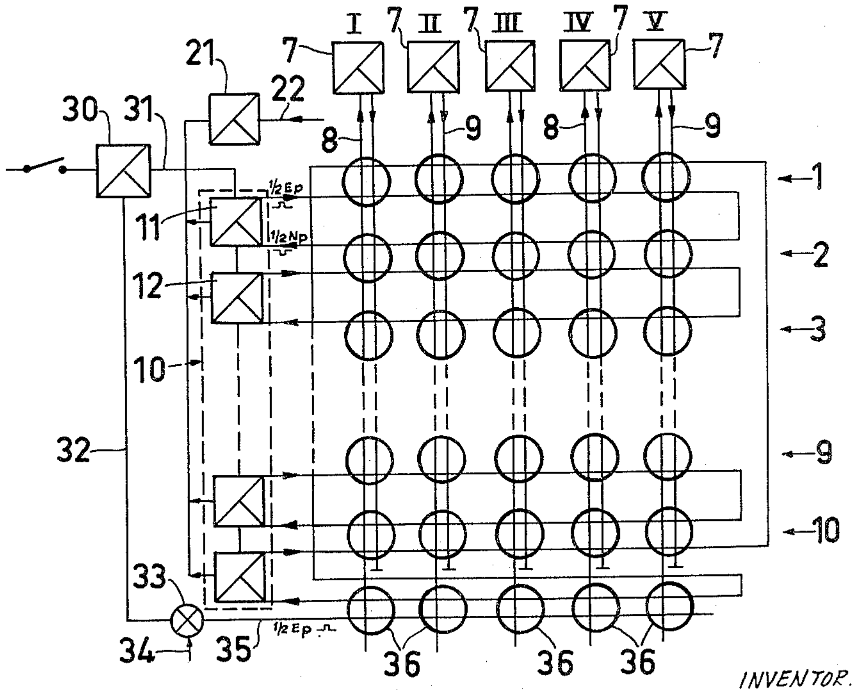
FIGURE 5 shows a register according to the invention, the register having a greater number of columns and rows of cores than shown in the preceding figures.

The shift register according to the preceding FIGURES 1, 3 and 4 may be enlarged to comprise greater numbers of rows and columns, utilizing the same pulse sequence generator 10. Since a decimal digit may be represented by five bits, i.e. five cores, the shift register should preferably contain five columns. A shift register built according to the above and containing eleven rows, including a row of auxiliary cores, with five cores per row, is shown in FIG. 5, in which again the same reference characters as before are used. Numbers with nine orders or digit positions at the most can be stored in this register, a row of zero-set (empty) cores (row 1 in FIG. 5) being required for carrying out a shift. In FIG. 5 the auxiliary cores 36 represent the "input end," the row 10 is the least significant position, the row 2 is the most significant position and the row 1 is the "output end." The shift direction is from below upwards, and the zero-setting pulse line 22 is linked with all cores in the columns I–V in the same way as in FIGS. 1 and 3, although, for the sake of simplicity, this has not been shown in FIG. 5. For each start pulse there is obtained a pulse sequence $T_1$–$T_{10}$ and the number is transferred or shifted one step in the shift direction. After nine start pulses the number has been shifted around to its original place.

The embodiments hereinbefore described and disclosed in the drawings are to be considered merely as examples, and their details may be modified in several ways within the scope of the appended claims. For example, a shift need not take place from one row or position to an adjacent one, but one or more rows may be skipped over.

What I claim is:

1. A magnetic memory shift register comprising a plurality of magnetic cores arranged in rows and columns each core having substantially rectangular hysteresis characteristics, two row coils on each core, one row coil being coupled to the cores in a read sense, the other in a write sense, a pulse sequence generator having a plurality of outputs each output being coupled to the read coils of one row and to the write coils of an adjacent row, said generator producing half pulses having an amplitude less than that for changing the saturation state of the associated cores, two column coils on each core, the first column coil being a reading coil and the second column coil being coupled to the cores in a write sense, a digit-plane coil coupled to the cores of all columns, a read drive half pulse generator connected to said digit-plane coil, said read drive generator delivering a half pulse to said digit-plane coil during the initial part of each pulse output from said pulse sequence generator, an individual delay amplifier for each column, each amplifier having an input connected to the first column coil of its column and an output connected to the second coil of its column whereby when the saturation state of a core is changed by coincidence of pulses from said read drive half pulse generator and said half pulse sequence generator a half pulse output from the corresponding column delay amplifier coincides with the terminal portion of a half pulse from said pulse sequence generator to change the state of the core in the particular column and adjacent row.

2. A shift register according to claim 1 in which each pulse sequence output connects to the read coils of a given row and the write coils of an adjacent row, said rows being arranged in a ring formation.

3. A shift register according to claim 1, having an output device comprising a plurality of output magnets corresponding in number to the amplifiers, each connected through a switch to its amplifier, and arranged to actuate a recording means so that the information in the several rows is recorded as coded characters when the switches are closed at a predetermined instant in a pulse sequence.

4. A shift register according to claim 1, having a zero-setting line linked with all elements in the register, whereby the whole register is zero-set when a current pulse is supplied to said line.

5. A shift register according to claim 1 including an input device for the selective input of information in the form of binary ones to the core row constituting the lowest denominational order of the register, said input device comprising a plurality of selectively operable switches corresponding to the number of cores per row, said switches being connected on one side to a common current source and on the other side individually to coils linking cores of said lowest denominational order row in a write sense to set binary ones therein.

6. A shift register according to claim 3 in which said pulse sequence generator generates a pulse train after each input operation in which one or more cores have been one-set, said pulse train causing a shift whereby the cores in said input row are zero-set to enable them to receive a new input.

References Cited in the file of this patent

UNITED STATES PATENTS

| | | |
|---|---|---|
| 2,691,156 | Saltz et al. | Oct. 5, 1954 |
| 2,708,267 | Weidenhammer | May 10, 1955 |
| 2,733,860 | Rajchman | Feb. 7, 1956 |
| 2,802,203 | Stuart-Williams | Aug. 6, 1957 |

FOREIGN PATENTS

| | | |
|---|---|---|
| 1,186,856 | France | Mar. 2, 1959 |